(12) United States Patent
Erb et al.

(10) Patent No.: US 10,132,522 B2
(45) Date of Patent: Nov. 20, 2018

(54) SYSTEMS AND METHODS FOR FORMING SPACER LEVELS OF A COUNTER FLOW ENERGY EXCHANGE ASSEMBLY

(71) Applicant: Nortek Air Solutions Canada, Inc., Saskatoon (CA)

(72) Inventors: Blake Norman Erb, Warman (CA); Stephen Hanson, Saskatoon (CA); Mohammad Afshin, Saskatoon (CA)

(73) Assignee: Nortek Air Solutions Canada, Inc., Saskatoon (CA)

( * ) Notice: Subject to any disclaimer, the term of this patent is extended or adjusted under 35 U.S.C. 154(b) by 244 days.

(21) Appl. No.: 14/230,682

(22) Filed: Mar. 31, 2014

(65) Prior Publication Data

US 2015/0276256 A1 Oct. 1, 2015

(51) Int. Cl.
  *F24F 12/00* (2006.01)
  *B21D 53/02* (2006.01)
  *F28D 9/00* (2006.01)
  *F28D 21/00* (2006.01)

(52) U.S. Cl.
  CPC .......... *F24F 12/006* (2013.01); *B21D 53/02* (2013.01); *F28D 9/0068* (2013.01); *F28D 21/0014* (2013.01); *Y02B 30/563* (2013.01); *Y10T 29/4935* (2015.01)

(58) Field of Classification Search
  CPC .. F24F 12/006; F28D 9/0068; F28D 21/0014; B21D 53/02; Y10T 29/4935; Y02B 30/563
  USPC .......................................... 165/166, 167, 54
  See application file for complete search history.

(56) References Cited

U.S. PATENT DOCUMENTS

| 3,042,382 | A | * | 7/1962 | Waldemar Hryniszak ................. F28D 9/0075 165/167 |
| 4,183,403 | A | * | 1/1980 | Nicholson ............. F28D 9/0062 165/166 |
| 7,331,376 | B2 | * | 2/2008 | Gagnon ................ F24F 12/006 165/166 |
| 8,157,891 | B2 | | 4/2012 | Montie |
| 8,376,036 | B2 | * | 2/2013 | Kammerzell ......... F24F 12/006 165/166 |

(Continued)

FOREIGN PATENT DOCUMENTS

| CA | 2416508 | 7/2004 |
| CN | 1244915 A | 2/2000 |

(Continued)

OTHER PUBLICATIONS

International Search Report and Written Opinion for Counterpart PCT/CA2015/000110, dated May 13, 2015.

(Continued)

*Primary Examiner* — Raheena R Malik
(74) *Attorney, Agent, or Firm* — Schwegman Lundberg & Woessner, P.A.

(57) ABSTRACT

A counter flow air-to-air energy exchange assembly may include a plurality of air channel levels configured to allow air to pass therethrough. Each of the air channels may include a spacer layer having a plurality of modular spacer components secured together. At least two of the modular spacer components are identical in size and shape. The spacer layer includes a plurality of air channels. Each of the plurality of air channels extends from an air inlet to an air outlet.

19 Claims, 8 Drawing Sheets

(56) References Cited

U.S. PATENT DOCUMENTS

| | | | | |
|---|---|---|---|---|
| 8,746,327 | B2* | 6/2014 | Mooij | F24F 12/006 165/103 |
| 2006/0196649 | A1* | 9/2006 | Shibata | F28D 9/0037 165/166 |
| 2008/0156469 | A1* | 7/2008 | Lee | F28D 9/0062 165/166 |
| 2008/0156470 | A1* | 7/2008 | Lee | F24F 12/006 165/166 |
| 2008/0156471 | A1* | 7/2008 | Han | F24F 12/006 165/166 |
| 2009/0314480 | A1 | 12/2009 | Grinbergs | |
| 2010/0071887 | A1* | 3/2010 | Sugiyama | F24F 12/006 165/166 |
| 2010/0224347 | A1* | 9/2010 | Urch | F24F 12/006 165/166 |
| 2012/0196523 | A1* | 8/2012 | Jiang | F24F 12/006 454/237 |

FOREIGN PATENT DOCUMENTS

| | | |
|---|---|---|
| DE | 20115568 | 11/2001 |
| JP | H08200972 | 8/1996 |
| JP | 2006002982 | 1/2006 |

OTHER PUBLICATIONS

Extended European Search Report for EP 15159498.3-1602/2950026, dated Jan. 12, 2016.

"European Application Serial No. 15159498.3, Response filed Aug. 9, 2016 to Extended European Search Report dated Jan. 12, 2016", 6 pgs.

"Chinese Application Serial No. 201510147527.1, Office Action dated Aug. 15, 2017", w/ English translation, 12 pgs.

"Chinese Application Serial No. 201510147527.1, Office Action dated Jun. 1, 2018", w/ English translation, 12 pgs.

* cited by examiner

SYSTEMS AND METHODS FOR FORMING SPACER LEVELS OF A COUNTER FLOW ENERGY EXCHANGE ASSEMBLY

BACKGROUND OF THE DISCLOSURE

Embodiments of the present disclosure generally relate to an energy exchange assembly, and, more particularly, to systems and methods for forming spacer levels of a counter flow energy exchange assembly.

Energy exchange assemblies are used to transfer energy, such as sensible and/or latent energy, between fluid streams. For example, air-to-air energy recovery cores are used in heating, ventilation, and air conditioning (HVAC) applications to transfer heat (sensible energy) and moisture (latent energy) between two airstreams. A typical energy recovery core is configured to precondition outdoor air to a desired condition through the use of air that is exhausted out of the building. For example, outside air is channeled through the assembly in proximity to exhaust air. Energy between the supply and exhaust air streams is transferred therebetween. In the winter, for example, cool and dry outside air is warmed and humidified through energy transfer with the warm and moist exhaust air. As such, the sensible and latent energy of the outside air is increased, while the sensible and latent energy of the exhaust air is decreased. The assembly typically reduces post-conditioning of the supply air before it enters the building, thereby reducing overall energy use of the system.

Energy exchange assemblies such as air-to-air recovery cores may include one or more membranes through which heat and moisture are transferred between air streams. Each membrane may be separated from adjacent membranes using a spacer. Stacked membrane layers separated by spacers form channels that allow air streams to pass through the assembly. For example, outdoor air that is to be conditioned may enter one side of the device, while air used to condition the outdoor air (such as exhaust air or scavenger air) enters another side of the device. Heat and moisture are transferred between the two airstreams through the membrane layers. As such, conditioned supply air may be supplied to an enclosed structure, while exhaust air may be discharged to an outside environment, or returned elsewhere in the building.

In an energy recovery core, for example, the amount of heat transferred is generally determined by a temperature difference and convective heat transfer coefficient of the two air streams, as well as the material properties of the membrane. The amount of moisture transferred in the core is generally governed by a humidity difference and convective mass transfer coefficients of the two air streams, but also depends on the material properties of the membrane.

Air-to-air energy recovery cores are typically formed as cross-flow or counter-flow assemblies. At least some cross flow air-to-air energy cores are manufactured through modular components.

In contrast, counter flow energy recovery cores, which are typically able to transfer more energy as compared to cross flow configurations, are not as easily manufactured due to their size and complexity. Typically, counter flow energy recovery cores are manufactured as a large, single piece. As such, the cost of manufacturing a typical counter flow energy recovery core may be high, due to increased tooling costs and longer manufacturing times. Further, by manufacturing each spacer of a counter flow energy recover core as a single part, each produced energy recovery core typically requires its own tooling, thereby adding additional costs.

However, a known counter-flow energy recovery core is formed through two, large counter flow cores, each of which includes a plurality of air channel levels, and two cross flow cores, also each having a plurality of air channel levels, to form a single hexagonal counter flow core. However, the counter flow cores typically need a 45 degree manifold angle for the cross flow cores to fit thereto. Moreover, when two counter flow cores are connected together, a relatively large number of cross flow cores are needed to complete a hexagonal assembly. As an example, when connecting three counter flow cores together, six cross flow cores are typically used to complete the overall hexagonal assembly.

Thus, known methods for forming counter flow air-to-air energy cores are typically time and labor-intensive, as well as expensive.

SUMMARY OF THE DISCLOSURE

Certain embodiments of the present disclosure provide a counter flow air-to-air energy exchange assembly including a plurality of air channel levels configured to allow air to pass therethrough. Each of the plurality of air channel levels may include a spacer layer including a plurality of modular spacer components secured together. At least two of the modular spacer components are identical in size and shape. The spacer layer may also include a plurality of air channels that extends from an air inlet to an air outlet.

In at least one embodiment, the spacer layer includes an outer boundary in the shape of a hexagon. In at least one embodiment, each of the plurality of air channels forms a Z-shape. In at least one other embodiment, each of the plurality of air channels forms a U-shape.

The plurality of modular spacer components may include a first spacer component and a second spacer component that is identical to the second spacer component. The first spacer component may directly secure to the second spacer component. That is, the first spacer component may directly abut into and secure to the second spacer such that a portion of the first spacer touches a portion of the second spacer.

In at least one embodiment, a third spacer component that differs from the first and second spacer components is positioned between the first and second spacer components. An outer boundary of the third spacer may be shaped as a hexagon. The spacer layer may also include a fourth spacer component that is identical to the third spacer component. The fourth spacer component may connect to the third spacer component. The third and fourth spacer components may be positioned between the first and second spacer components. In at least one embodiment, the third and fourth spacer components may be identical to the first and second spacer components.

In at least one embodiment, each of the first and second spacer components have an outer boundary shaped as a trapezoid.

In at least one embodiment, the spacer layer may include a fifth spacer component that differs from the first, second, third, and fourth spacer components. The fifth spacer component provides an expansion piece.

Certain embodiments of the present disclosure provide a method of forming a counter flow air-to-air energy exchange assembly including a plurality of air channel levels configured to allow air to pass therethrough. The method may include securing a plurality of modular spacer components together, wherein at least two of the modular spacer components are identical in size and shape, forming a spacer layer through the securing operation, positioning at least one membrane on the spacer layer to form an air channel level, and stacking the air channel level over another air channel level. Each of the plurality of air channels extends from an air inlet to an air outlet.

Certain embodiments of the present disclosure provide a spacer layer assembly configured to form part of an air channel level of a counter flow air-to-air energy exchange assembly. The spacer layer assembly may include a plurality of modular spacer components secured together. At least two of the modular spacer components are identical in size and shape.

DETAILED DESCRIPTION OF THE DISCLOSURE

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Figure 1:
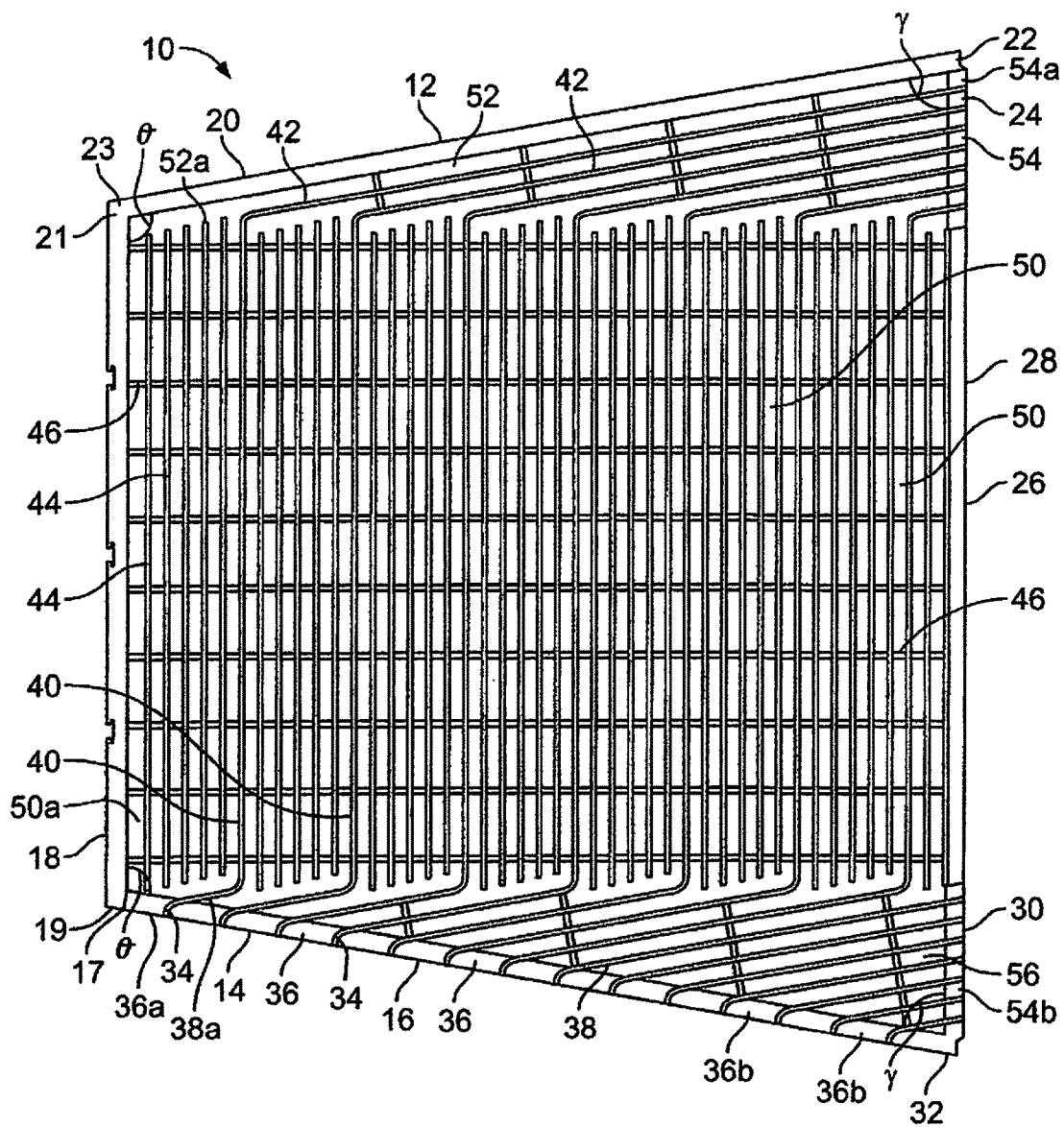
FIG. 1 illustrates a top plan view of a spacer component, according to an embodiment of the present disclosure.

FIG. 1 illustrates a top plan view of a spacer component 10, according to an embodiment of the present disclosure. The spacer component 10 may be formed as an integral piece of injection-molded plastic, for example. The spacer component 10 includes a main body 12 having an outer boundary or frame 14 including a flat support beam 16 having an outer end 17 that connects to a terminal end 19 of a perpendicular outer boundary wall 18 at an obtuse angle θ. The perpendicular outer boundary wall 18 may be or include a linear upstanding wall that extends from the terminal end 19 to an opposite terminal end 21, which, in turn, connects to an outer end 23 of an upstanding lateral boundary wall 20 at an obtuse angle θ. The upstanding lateral boundary wall 20 is upstanding, in contrast to the flat support beam 16.

The upstanding lateral boundary wall 20 may be or include a linear upstanding wall that extends from the outer end 23 to an interior end 22. The interior end 22 of the lateral boundary wall 20 connects to a flat support beam 24 of an interior connecting wall 26 at an acute angle γ. The flat support beam 24 of the interior connecting wall 26 linearly connects to an upstanding intermediate boundary 28, which, in turn, connects to a flat support beam 30 opposite from the flat support beam 24. As shown, the terminal ends of the interior connecting wall 26 are flat support beams 24 and 30, while the upstanding intermediate boundary 28 is solid wall portion. The flat support beam 30, in turn, connects to an interior end 32 of the flat support beam 16 at an acute angle γ.

A plurality of upstanding inlet channel vanes or walls 34 extend upwardly from the flat support beam 16, thereby forming air inlets 36 therebetween. The inlet channel walls 34 connect to angled routing walls 38 that extend inwardly and toward the interior connecting wall 26. Each angled routing wall 38 connects to an interior linear cross wall 40 that extends toward the lateral boundary wall 20. Distal ends of each interior linear cross wall 40 connect to an angled routing wall 42 that is parallel with the lateral boundary wall 20.

Multiple parallel interior cross walls 44 are positioned between the outer boundary wall 18 and the interior connecting wall 26. The interior cross walls 44 are parallel with the outer boundary wall 18, the interior connecting wall 26, and the interior cross walls 40. Support struts 46 that are perpendicular to the interior cross walls 40 and 44 extend beneath, above, and/or through the interior cross walls 40 and 44 from the interior connecting wall 26 to the outer boundary wall 18. The support struts 46 securely support the interior cross walls 40 and 44 in place. The spacer component 10 may not include a planar lower or upper base that extends between its outer boundaries. As such, the areas between struts 46 and cross walls 40 and 44, for example, may be open above, below, and through (when no membrane is positioned above or below the spacer component 10).

As shown, an outer boundary of the spacer component 10 forms a trapezoid shape, with the outer boundary wall 18 parallel to the interior connecting wall 26. A plurality of aligned air channels 50 are formed through the spacer component 10. For example, air may enter an air inlet 36 proximate to the outer boundary wall 18, and be routed to one of a plurality of aligned linear air channels 50a by the routing wall 38a. The air may then be directed to an air channel segment 52a (one of a plurality of air channel segments 52) that is parallel with the lateral boundary wall 20 and out through an air outlet 54a over the flat support beam 24. While the spacer component 10 is shown as having six air channels 50 connected to a single air inlet 36 and a single air outlet 54, it is understood that the single air inlet 36 and the single air outlet 54 may be connected to more or less air channels 50 than shown.

Further, air inlet 36b proximate to the flat support beam connects to air channels 56 that connect to air outlets 54b that extend over the flat support beam 30. As such, the air inlets 36b do not connect to linear air channels 50 that extend across the spacer component 10.

Alternatively, the pattern of air flow may be reversed, such that the air inlets are air outlets, and air outlets are air inlets. In such an example, air may enter through the air outlet 54a and pass out of the spacer component through the air inlet 36a, for example. Indeed, as the spacer component 10 is configured to have membranes secured over and above, such that another spacer component 10 is stacked over the top membrane, the stacked membranes form air passage or channel levels. Air flow through one air passage level will be the opposite from an air passage level immediately above and/or below.

The membrane(s) may be formed of polytetrafluoroethylene (PTFE), polypropylene (PP), nylon, polyvinylidene fluoride (PVDF), polyethersulfone (PES), or the like. The membrane may be water vapor permeable or impermeable.

Figure 2:
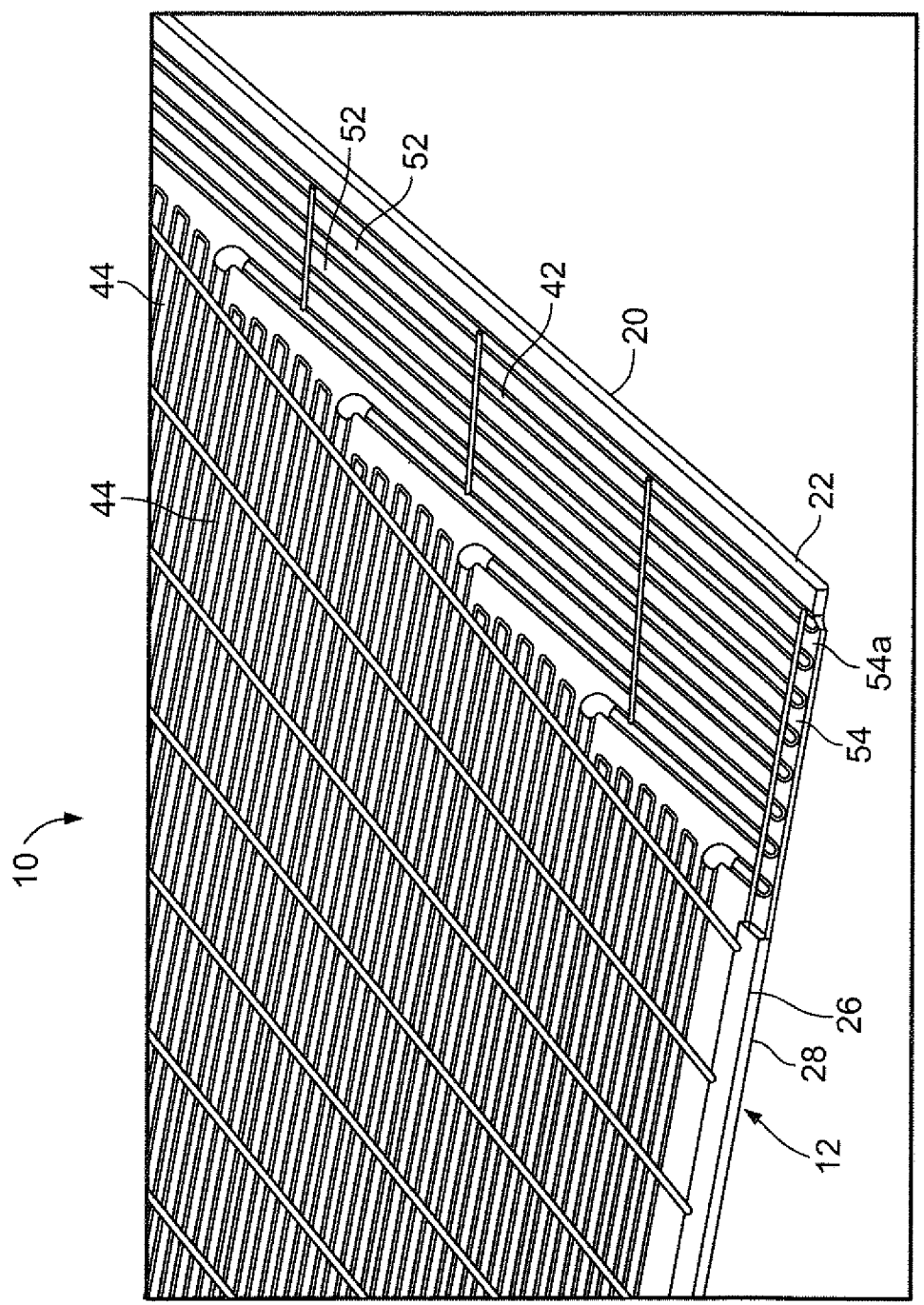
FIG. 2 illustrates a top perspective view of air outlets connected to air channels of a spacer component, according to an embodiment of the present disclosure.

FIG. 2 illustrates a top perspective view of air outlets connected to air channels of a spacer component, according to an embodiment of the present disclosure. Top and bottom surfaces of each of the lateral boundary wall 20, the outer boundary wall 18 (not shown in FIG. 2), the upstanding intermediate boundary wall 28, the angled routing walls 42, the angled routing walls 38 (not shown in FIG. 2), and the interior cross walls 40 and 44 may be configured to be securely connected to interior surfaces of membranes (not shown), such as through bonding, adhesives, and/or the like.

Figure 3:
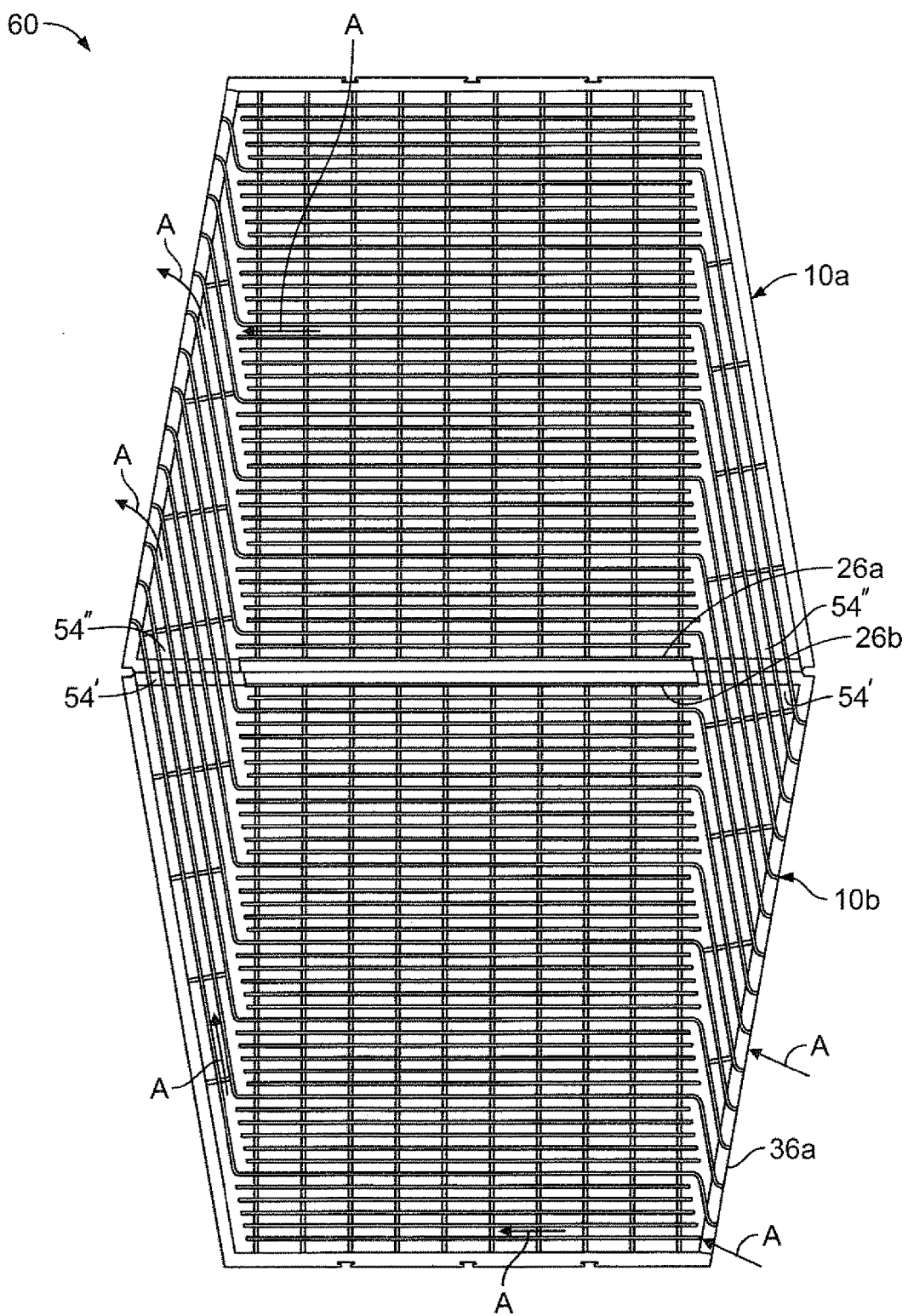
FIG. 3 illustrates a top plan view of two spacer components secured together to form a spacer layer of an energy exchange assembly, according to an embodiment of the present disclosure.

FIG. 3 illustrates a top plan view of two spacer components 10a and 10b secured together to form a spacer layer 60 of an energy exchange assembly, according to an embodiment of the present disclosure. In order to form the spacer layer 60, the interior connecting walls 26a and 26b of each spacer component 10a and 10b, respectively, are aligned with one another, and connected together, such as through fasteners, adhesives, tape, mechanical connections (for example, snap fit members, tongue and groove connections, tabs and slots, and the like), and/or the like. As shown, air channel openings 54' of the spacer component 10b align with air channel openings 54" of the spacer component 10a. Accordingly, air may flow through the spacer layer 60 in the directions of arrows A from inlets 36a of the spacer component 10b to outlets 36b of the spacer component 10a, or vice versa. The spacer layer 60 may be formed from identical pieces, namely the spacer components 10a and 10b. Therefore, a single mold may be used to form a plurality of spacer components 10a and 10b that may be modularly connected to form the spacer layer 60.

It is to be understood that the term "identical" refers to pieces that may be formed from a mold having a reciprocal shape. That is, identical pieces may be formed the same in terms of size and shape. A modification of one of the identical pieces to remove one or more features after the pieces have been formed does not mean that they are no longer identical. Further, forming the pieces as different colors does not mean that they are not identical. Instead, the pieces are still identical, with one or both being modified after a forming process. The forming process may include an injection-molding process, for example. Notably, forming one piece from a first injection-molded plastic, and another piece from a second injection molded plastic does not mean that the pieces are not identical in terms of size and shape.

While not shown, membranes may be secured over and above the spacer layer 60. The membranes may be configured to transfer sensible and latent energy therethrough, while ensuring that air passes through the defined air channels within the spacer layer 60.

Figure 4:
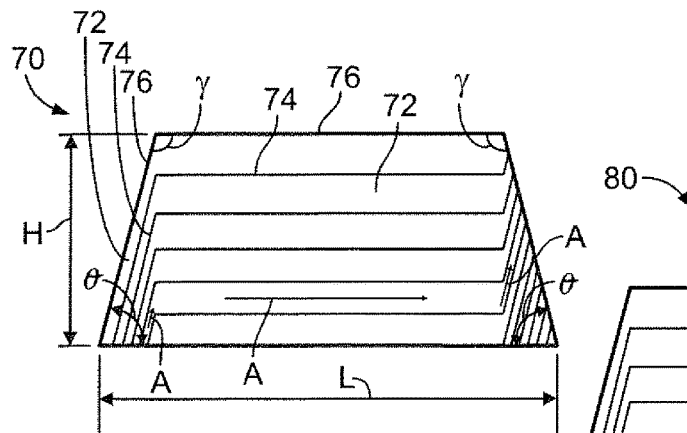
FIG. 4 illustrates a top plan view of a spacer component, according to an embodiment of the present disclosure.

FIG. 4 illustrates a top plan view of a spacer component 70, according to an embodiment of the present disclosure. The spacer component 70 is similar to the spacer component 10. The spacer component 70 includes air channels 72 defined between air flow guides 74 and/or boundary walls 76. The spacer component 70 is configured to direct air flow through each air channel 72 in the direction of arrows A, or in the opposite direction. The angles θ may be 45°, for example.

The spacer component 70 may be sized and shaped to a particular desired size and shape. For example, the spacer component may have a height H of 6" and a length of 18". The height H may be any height, while the length L may be any length. Moreover, the angles θ may be greater or less than 45°, while the angles γ may be greater or less than 110°.

Figure 5:
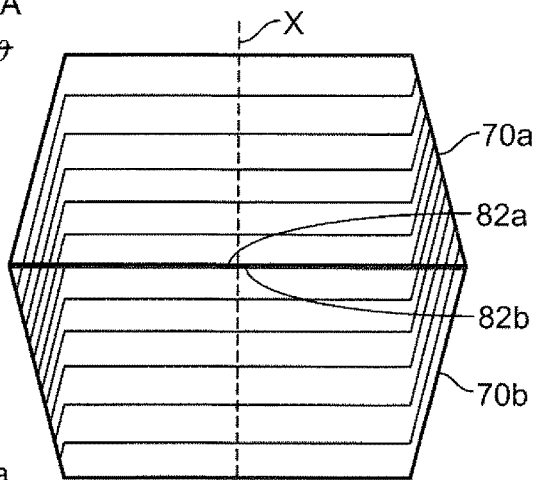
FIG. 5 illustrates a top plan view of two spacer components secured together to form a spacer layer of an energy exchange assembly, according to an embodiment of the present disclosure.

FIG. 5 illustrates a top plan view of two spacer components 70a and 70b secured together to form a spacer layer 80 of an energy exchange assembly, according to an embodiment of the present disclosure. The spacer layer 80 is similar to the spacer layer 60 shown in FIG. 3. As shown, two identical spacer components 70a and 70b are connected together to form the spacer layer 80. Each spacer component 70a and 70b is formed as a trapezoid. As such, when the interior connecting walls 82a and 82 are connected together, the resulting outer boundary of the spacer layer 80 is hexagonal. After the spacer layer 80 is formed, membranes may be secured to a top and bottom, thereby forming a level of an energy exchange assembly. The levels may then be vertically stacked with respect to one another.

Figure 6:
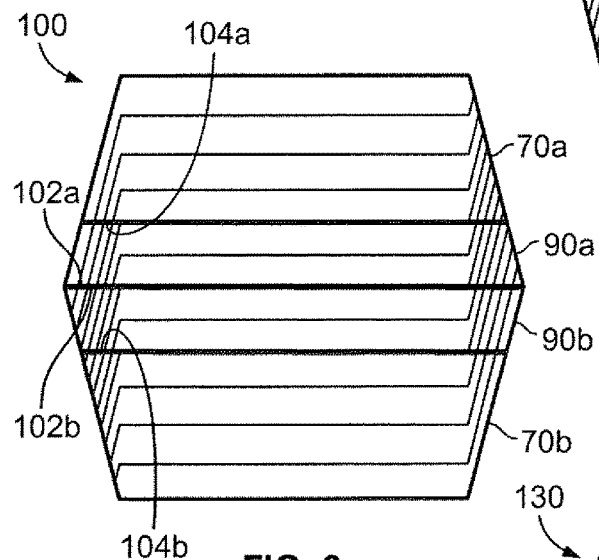
FIG. 6 illustrates a top plan view of four spacer components secured together to form a spacer layer of an energy exchange assembly, according to an embodiment of the present disclosure.

FIG. 6 illustrates a top plan view of four spacer components 70a, 70b, 90a, and 90b secured together to form a spacer layer 100 of an energy exchange assembly, according to an embodiment of the present disclosure. The spacer components 70a and 70b are identical to one another. As shown in FIG. 6, the spacer components 70a and 70b are oriented in the spacer layer 100 to be mirror images of one another. Similar, the spacer components 90a and 90b are identical to one another, although mirror images when connected together.

The spacer components 70a, 70b, 90a, and 90b are formed as trapezoids. Notably, the spacer components 90 and 90b include interconnecting walls 102a and 102b that may be longer than the interconnecting walls 104a and 104b, which connect to the interconnecting walls 106a and 106b of the spacer components 70a and 70b, respectively.

The spacer components 90a and 90b provide expansion pieces that form the spacer layer 100 larger than the spacer layer 80 (shown in FIG. 5). As shown, the spacer layer 100 is formed from two identical spacer components 70a and 70b and two identical spacer components 90a and 90b.

Additionally expansion piece spacer components that are larger than the spacer components 90a and 90b may be used to provide an even larger spacer layer.

Figure 7:
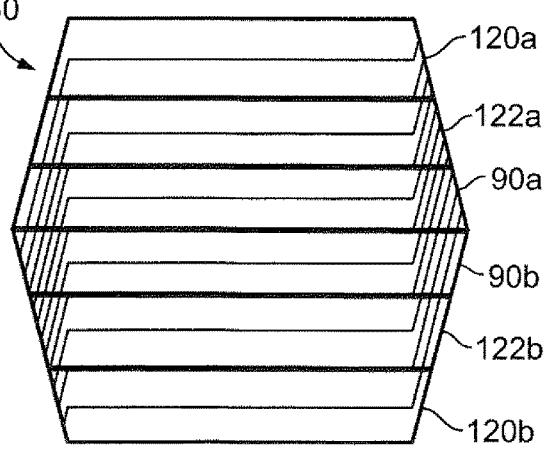
FIG. 7 illustrates a top plan view of six spacer components secured together to form a spacer layer of an energy exchange assembly, according to an embodiment of the present disclosure.

FIG. 7 illustrates a top plan view of six spacer components 90a, 90b, 120a, 120b, 122a, and 122b secured together to form a spacer layer 130 of an energy exchange assembly, according to an embodiment of the present disclosure. The spacer layer 130 is similar to the spacer layer 100 (shown in FIG. 6), except that instead of single, unitary spacer components 70a, spacer components 120a and 120b connect to spacers components 122a and 122b, respectively, to form a shape that is similar to the spacer components 70a and 70b, respectively.

Figure 8:
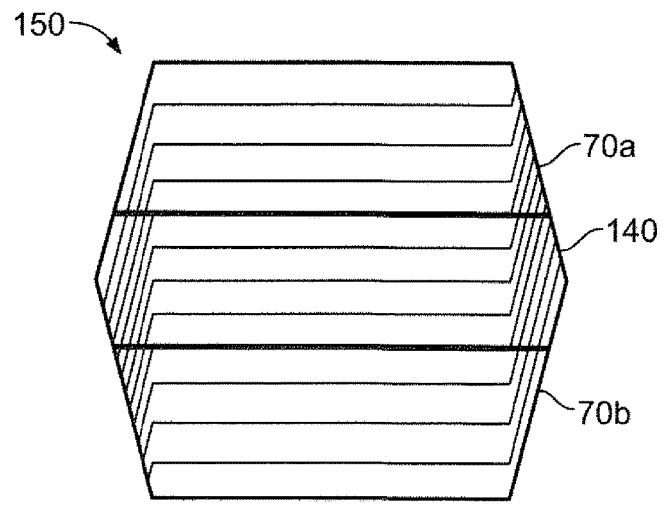
FIG. 8 illustrates a top plan view of three spacer components secured together to form a spacer layer of an energy exchange assembly, according to an embodiment of the present disclosure.

FIG. 8 illustrates a top plan view of three spacer components 70a, 70b, and 140 secured together to form a spacer layer 150 of an energy exchange assembly, according to an embodiment of the present disclosure. The spacer layer 150 is similar to the spacer layer 100 (shown in FIG. 6), except that instead of using two separate and distinct (although identical) spacer components 90a and 90b, the single hexagonal intermediate spacer component 140 connects to each of the spacer components 70a and 70b.

Figure 9:
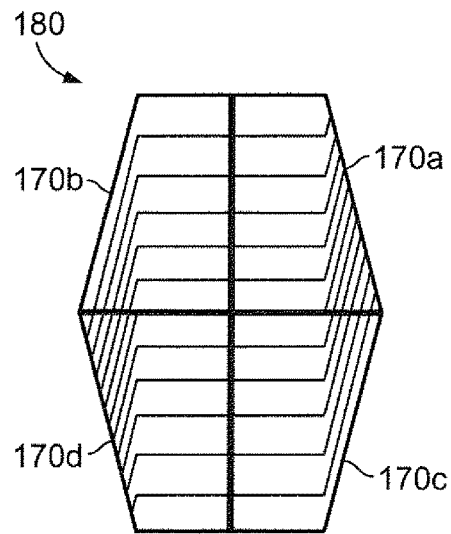
FIG. 9 illustrates a top plan view of four spacer components secured together to form a spacer layer of an energy exchange assembly, according to an embodiment of the present disclosure.

FIG. 9 illustrates a top plan view of four spacer components 170a, 170b, 170c, and 170d secured together to form a spacer layer 180 of an energy exchange assembly, according to an embodiment of the present disclosure. The spacer components 170a, 170b, 170c, and 170d are identical to one another. The spacer layer 180 is similar to the spacer 80 shown in FIG. 5, except that, in reference to FIG. 5, the spacer components 70a and 70b may be split in half along central axes X to form the spacer layers 170a, 170b, 170c, and 170d. As such, the spacer layer 180 may be formed from four identical spacer components.

Figure 10:
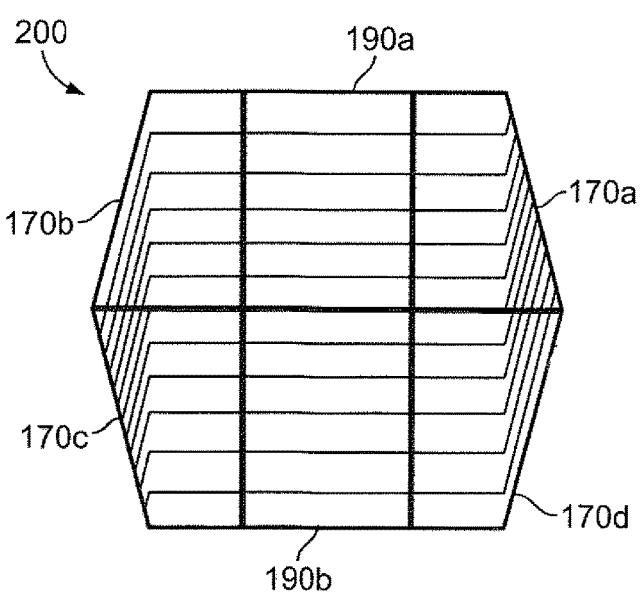
FIG. 10 illustrates a top plan view of four spacer components secured together to form a spacer layer of an energy exchange assembly, according to an embodiment of the present disclosure.

FIG. 10 illustrates a top plan view of six spacer components 170a, 170b, 170c, 170d, 190a, and 190b secured together to form a spacer layer 200 of an energy exchange assembly, according to an embodiment of the present disclosure. The spacer components 190a and 190b may be rectangular expansion pieces that allow the larger (in comparison to the spacer layer 180 of FIG. 9) spacer layer 200 to be formed. Accordingly, the spacer layer 200 may be formed with four identical pieces 170-d, and two identical pieces 190a and 190b.

Referring to FIGS. 1-10, spacer layers may be modularly formed from multiple spacer components, at least two of which are identical. Membranes may be secured to the spacer layers to form air passage or channel levels. The air channel levels may be vertically stacked to a desired height to form an air-to-air energy exchange assembly. Embodiments of the present disclosure provide systems and methods for efficiently and cost-effectively forming an energy exchange assembly. As shown in FIGS. 1-10, each formed air channel level may have an outer boundary in the shape of a hexagon.

Figure 11:
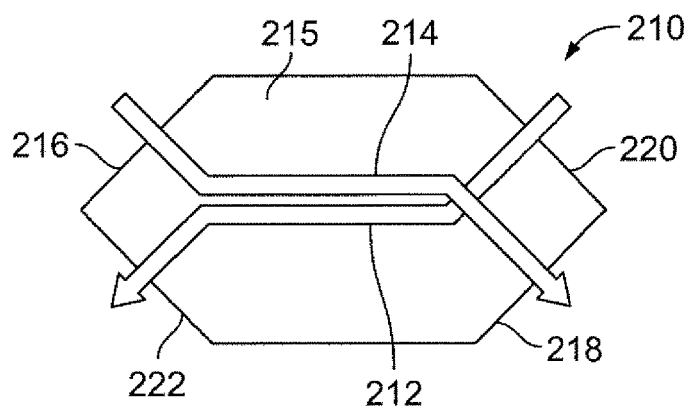
FIG. 11 illustrates a simplified schematic of an air-to-air energy exchange assembly according to an embodiment of the present disclosure.

FIG. 11 illustrates a simplified schematic of an air-to-air energy exchange assembly 210 according to an embodiment of the present disclosure. The assembly 210 includes a plurality air channel levels 212 and 214, each of which is formed by a spacer level (hidden from view in FIG. 11) covered on top and/or bottom by a membrane 215. Airflow through the air channel levels 212 counter flows with the airflow through the air channel levels 214. The air channel levels 212 and 214 may be formed through modular spacer components, as described above, to form a hexagonal assembly 210, as shown.

Air within the air channel levels 214 enters the assembly 210 through an inlet side 216 and passes out of the assembly through an outlet side 218. Similarly, air within the air channel levels 212 enters the assembly 210 through an inlet side 220 and passes out of the assembly 210 through an outlet side 222. Sensible and latent energy may be transferred between the air within the air channel levels 212 and 214 during the counter flow shown in FIG. 11.

Figure 12:
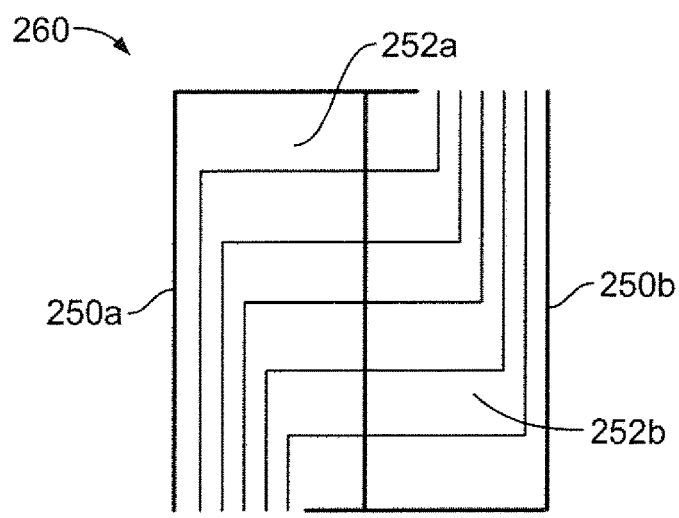
FIG. 12 illustrates a top plan view of two spacer components secured together to form a spacer layer of an energy exchange assembly, according to an embodiment of the present disclosure.

FIG. 12 illustrates a top plan view of two spacer components 250a and 250b secured together to form a spacer layer 260 of an energy exchange assembly, according to an embodiment of the present disclosure. Each spacer components 250a and 250b are identical, with each defining L-shaped air channels 252a and 252b, respectively. The spacer components 250a and 250b may be shaped as rectangles. As shown, the spacer components 250a and 250b may connect together to form Z-shaped air channels. Accordingly, the single spacer layer 260 is formed from two identical pieces, namely the spacer components 250a and 250b.

Figure 13:
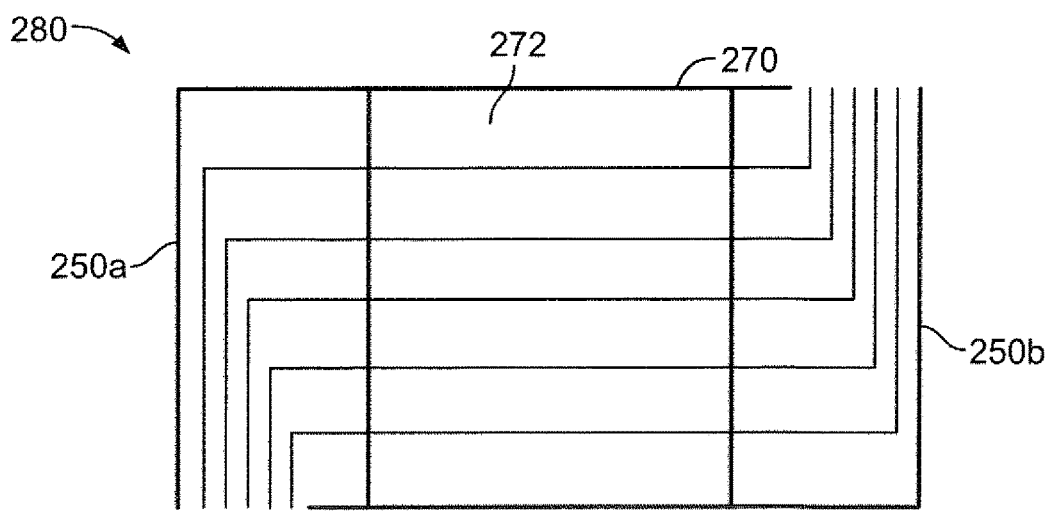
FIG. 13 illustrates a top plan view of three spacer components secured together to form a spacer layer of an energy exchange assembly, according to an embodiment of the present disclosure.

FIG. 13 illustrates a top plan view of three spacer components 250a, 250b and 270 secured together to form a spacer layer 280 of an energy exchange assembly, according to an embodiment of the present disclosure. The spacer layer 280 is similar to the spacer layer 260 (shown in FIG. 12), except that the spacer component 270 (having parallel linear air channel segments 272 that extend across the spacer component 270) connects between the spacer components 250a and 250b.

Figure 14:
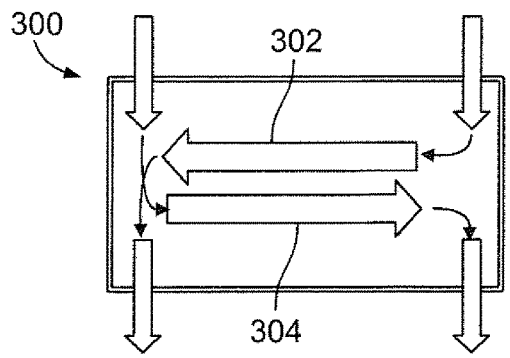
FIG. 14 illustrates a simplified schematic of an air-to-air energy exchange assembly according to an embodiment of the present disclosure.

FIG. 14 illustrates a simplified schematic of an air-to-air energy exchange assembly 300 according to an embodiment of the present disclosure. The assembly 300 may be formed by any of the spacer layers shown in FIGS. 12 and 13 and membranes to form air channel levels 302 and 304 that channel air in a Z-shaped pattern.

Figure 15:
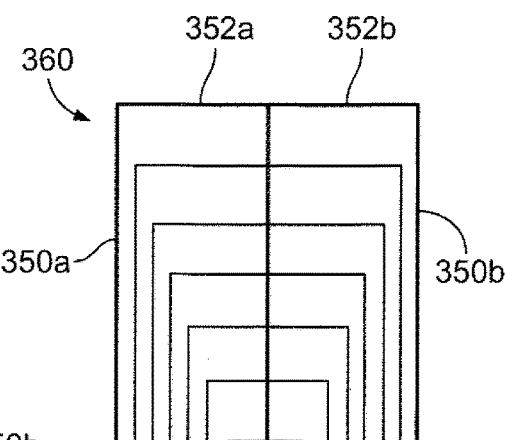
FIG. 15 illustrates a top plan view of two spacer components secured together to form a spacer layer of an energy exchange assembly, according to an embodiment of the present disclosure.

FIG. 15 illustrates a top plan view of two spacer components 350a and 350b secured together to form a spacer layer 360 of an energy exchange assembly, according to an embodiment of the present disclosure. The spacer components 350a and 350b are identical, with each defining L-shaped air channels 352a and 352b, respectively. Outer boundaries of the spacer components 350a and 350b may be shaped as rectangles. As shown, the spacer components 350a and 350b may connect together to form U-shaped air channels. Accordingly, the single spacer layer 360 is formed from two identical pieces, namely the spacer components 350a and 350b.

Figure 16:
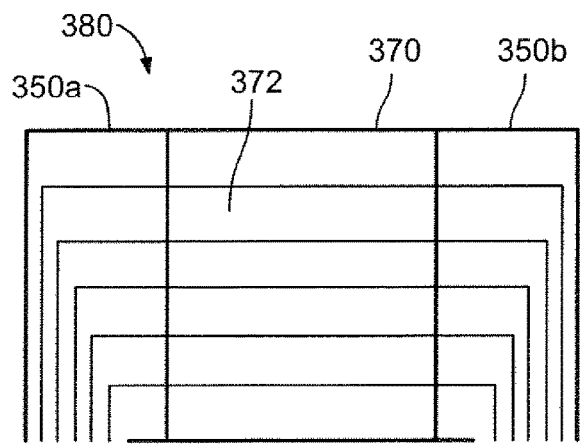
FIG. 16 illustrates a top plan view of three spacer components secured together to form a spacer layer of an energy exchange assembly, according to an embodiment of the present disclosure.

FIG. 16 illustrates a top plan view of three spacer components 350a, 350b and 370 secured together to form a spacer layer 380 of an energy exchange assembly, according to an embodiment of the present disclosure. The spacer layer 380 is similar to the spacer layer 360 (shown in FIG. 15), except that the spacer component 370 (having parallel linear air channel segments 372 that extend across the spacer component 370) connects between the spacer components 350a and 350b.

Figure 17:
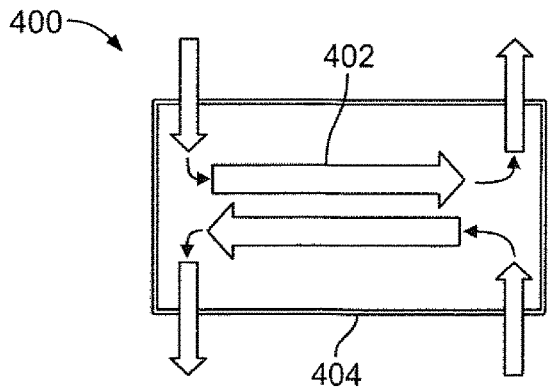
FIG. 17 illustrates a simplified schematic of an air-to-air energy exchange assembly according to an embodiment of the present disclosure.

FIG. 17 illustrates a simplified schematic of an air-to-air energy exchange assembly 400 according to an embodiment of the present disclosure. The assembly 400 may be formed by any of the spacer layers shown in FIGS. 15 and 16 and membranes to form air channel levels 402 and 404 that channel air in a U-shaped pattern.

Figure 18:
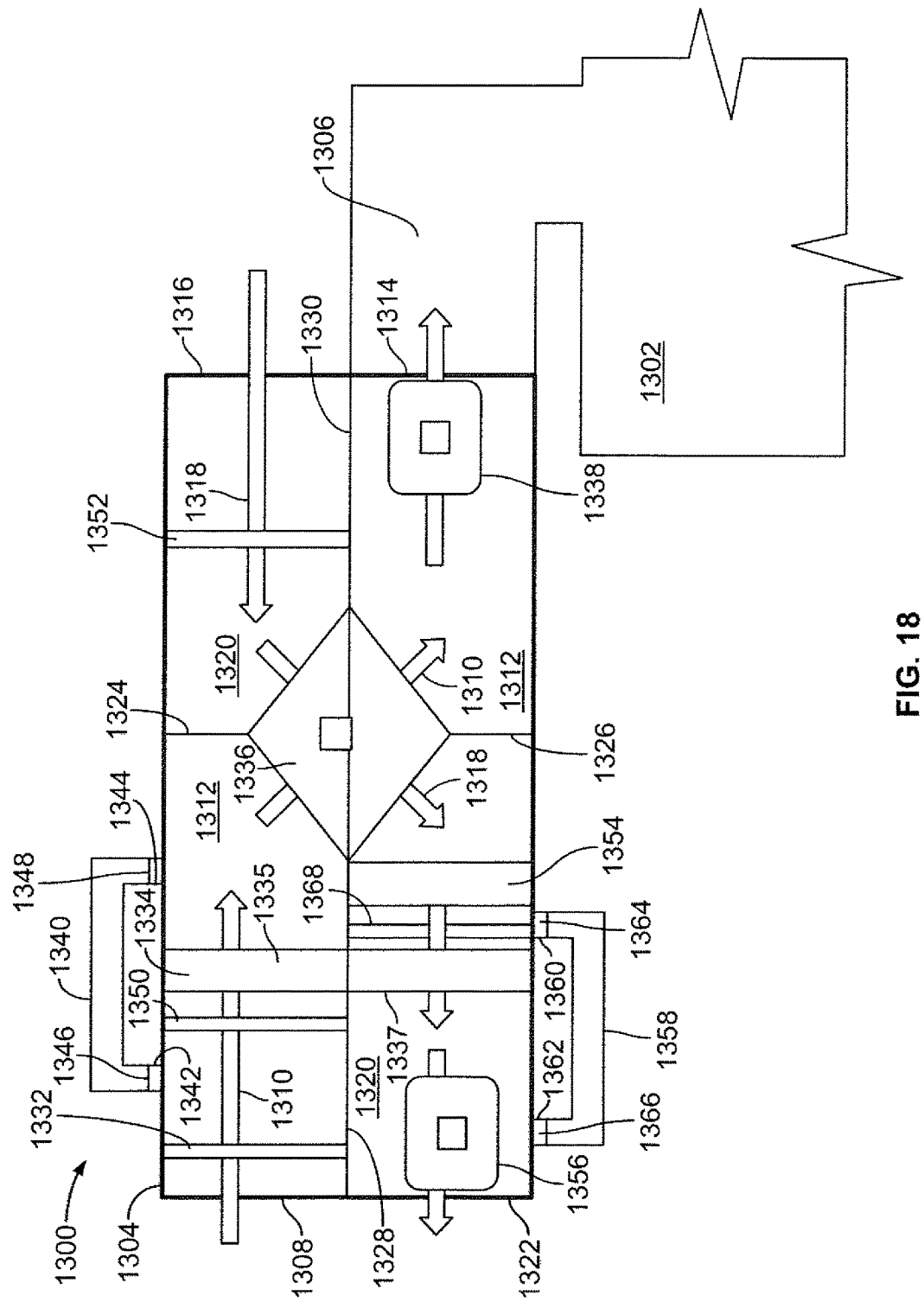
FIG. 18 illustrates a simplified schematic view of an energy exchange system operatively connected to an enclosed structure, according to an embodiment of the present disclosure.

FIG. 18 illustrates a simplified schematic view of an energy exchange system 1300 operatively connected to an enclosed structure 1302, according to an embodiment of the present disclosure. The energy exchange system 1300 may include a housing 1304, such as a self-contained module or unit that may be mobile (for example, the housing 1304 may be moved among a plurality of enclosed structures), operatively connected to the enclosed structure 1302, such as through a connection line 1306, such as a duct, tube, pipe, conduit, plenum, or the like. The housing 1304 may be configured to be removably connected to the enclosed structure 1302. Alternatively, the housing 1304 may be permanently secured to the enclosed structure 1302. As an example, the housing 1304 may be mounted to a roof, outer wall, or the like, of the enclosed structure 1302. The enclosed structure 1302 may be a room of a building, a storage structure (such as a grain silo), or the like.

The housing 1304 includes a supply air inlet 1308 that connects to a supply air flow path 1310. The supply air flow path 1310 may be formed by ducts, conduits, plenum, channels, tubes, or the like, which may be formed by metal and/or plastic walls. The supply air flow path 1310 is configured to deliver supply air 1312 to the enclosed structure 1302 through a supply air outlet 1314 that connects to the connection line 1306.

The housing 1304 also includes a regeneration air inlet 1316 that connects to a regeneration air flow path 1318. The regeneration air flow path 1318 may be formed by ducts, conduits, plenum, tubes, or the like, which may be formed by metal and/or plastic walls. The regeneration air flow path 1318 is configured to channel regeneration air 1320 received from the atmosphere (for example, outside air) back to the atmosphere through an exhaust air outlet 1322.

As shown in FIG. 18, the supply air inlet 1308 and the regeneration air inlet 1316 may be longitudinally aligned. For example, the supply air inlet 1308 and the regeneration air inlet 1316 may be at opposite ends of a linear column or row of ductwork. A separating wall 1324 may separate the supply air flow path 1310 from the regeneration air flow path 1318 within the column or row. Similarly, the supply air outlet 1314 and the exhaust air outlet 1322 may be longitudinally aligned. For example, the supply air outlet 1314 and the exhaust air outlet 1322 may be at opposite ends of a linear column or row of ductwork. A separating wall 1326 may separate the supply air flow path 1310 from the regeneration air flow path 1318 within the column or row.

The supply air inlet 1308 may be positioned above the exhaust air outlet 1322, and the supply air flow path 1310 may be separated from the regeneration air flow path 1318 by a partition 1328. Similarly, the regeneration air inlet 1316 may be positioned above the supply air outlet 1314, and the supply air flow path 1310 may be separated from the regeneration air flow path 1318 by a partition 1330. Thus, the supply air flow path 1310 and the regeneration air flow path 1318 may counter-flow with one another proximate to a center of the housing 1304. While the supply air inlet 1308 may be at the top and left of the housing 1304 (as shown in FIG. 18), the supply air outlet 1314 may be at the bottom and right of the housing 1304 (as shown in FIG. 18). Further, while the regeneration air inlet 1316 may be at the top and right of the housing 1304 (as shown in FIG. 18), the exhaust air outlet 1322 may be at the bottom and left of the housing 1304 (as shown in FIG. 18).

Alternatively, the supply air flow path 1310 and the regeneration air flow path 1318 may be inverted and/or otherwise re-positioned. For example, the exhaust air outlet 1322 may be positioned above the supply air inlet 1308. Additionally, alternatively, the supply air flow path 1310 and the regeneration air flow path 1318 may be separated from one another by more than the separating walls 1324 and 1326 and the partitions 1328 and 1330 within the housing 1304. For example, spaces, which may contain insulation, may also be positioned between segments of the supply air flow path 1310 and the regeneration air flow path 1318. Also, alternatively, the supply air flow path 1310 and the regeneration air flow path 1318 may simply be straight, linear segments that do not cross one another. Further, instead of being stacked, the housing 1304 may be shifted 180 degrees about a longitudinal axis aligned with the partitions 1328 and 1330, such that that supply air flow path 1310 and the regeneration air flow path 1318 are side-by-side, instead of one on top of another.

An air filter 1332 may be disposed within the supply air flow path 1310 proximate to the supply air inlet 1308. The air filter 1332 may be a standard HVAC filter configured to filter contaminants from the supply air 1312. Alternatively, the energy exchange system 1300 may not include the air filter 1332.

An energy transfer device 1334 may be positioned within the supply air flow path 1310 downstream from the supply air inlet 1308. The energy transfer device 1334 may span between the supply air flow path 1310 and the regeneration air flow path 1318. For example, a supply portion or side 1335 of the energy transfer device 1334 may be within the supply air flow path 1310, while a regenerating portion or side 1337 of the energy transfer device 1334 may be within the regeneration air flow path 1318. The energy transfer device 1334 may be a desiccant wheel, for example. However, the energy transfer device 1334 may be various other systems and assemblies, such as including liquid-to-air membrane energy exchangers (LAMEEs), as described below.

A counter-flow, air-to-air energy exchange assembly 1336, which may be formed as described in FIGS. 1-17, is disposed within the supply air flow path 1310 downstream from the energy transfer device 1334. The energy exchange assembly 1336 may be positioned at the junction of the separating walls 1324, 1326 and the partitions 1328, 1330. The energy exchange assembly 1336 may be positioned within both the supply air flow path 1310 and the regeneration air flow path 1318. As such, the energy exchange assembly 1336 is configured to transfer energy between the supply air 1312 and the regeneration air 1320.

One or more fans 1338 may be positioned within the supply air flow path 1310 downstream from the energy exchange assembly 1336. The fan(s) 1338 is configured to move the supply air 1312 from the supply air inlet 1308 and out through the supply air outlet 1314 (and ultimately into the enclosed structure 1302). Alternatively, the fan(s) 1338 may be located at various other areas of the supply air flow path 1310, such as proximate to the supply air inlet 1308. Also, alternatively, the energy exchange system 1300 may not include the fan(s).

The energy exchange system 1300 may also include a bypass duct 1340 having an inlet end 1342 upstream from the energy transfer device 1334 within the supply air flow path 1310. The inlet end 1342 connects to an outlet end 1344 that is downstream from the energy transfer device 1334 within the supply air flow path 1310. An inlet damper 1346 may be positioned at the inlet end 1342, while an outlet damper 1348 may be positioned at the outlet end 1344. The dampers 1346 and 1348 may be actuated between open and closed positions to provide a bypass line for the supply air 1312 to bypass around the energy transfer device 1334. Further, a damper 1350 may be disposed within the supply air flow path 1310 downstream from the inlet end 1342 and upstream from the energy transfer device 1334. The damper 1350 may be closed in order to allow the supply air 1312 to flow into the bypass duct 1340 around the energy transfer device 1334. The dampers 1346, 1348, and 1350 may be modulated between fully-open and fully-closed positions to allow a portion of the supply air 1312 to pass through the energy transfer device 1334 and a remaining portion of the supply air 1312 to bypass the energy transfer device 1334. As such, the bypass dampers 1346, 1348, and 1350 may be operated to control the temperature and humidity of the supply air 1312 as it is delivered to the enclosed structure 1302. Examples of bypass ducts and dampers are further described in U.S. patent application Ser. No. 13/426,793, which was filed Mar. 22, 2012, and is hereby incorporated by reference in its entirety. Alternatively, the energy exchange system 1300 may not include the bypass duct 1340 and dampers 1346, 1348, and 1350.

As shown in FIG. 18, the supply air 1312 enters the supply air flow path 1310 through the supply air inlet 1308. The supply air 1312 is then channeled through the energy transfer device 1334, which pre-conditions the supply air 1312. After passing through the energy transfer device 1334, the supply air 1312 is pre-conditioned and passes through the energy exchange assembly 1336, which conditions the pre-conditioned supply air 1312. The fan(s) 1338 may then move the supply air 1312, which has been conditioned by the energy exchange assembly 1336, through the energy exchange assembly 1336 and into the enclosed structure 1302 through the supply air outlet 1314.

With respect to the regeneration air flow path 1318, an air filter 1352 may be disposed within the regeneration air flow path 1318 proximate to the regeneration air inlet 1316. The air filter 1352 may be a standard HVAC filter configured to filter contaminants from the regeneration air 1320. Alternatively, the energy exchange system 1300 may not include the air filter 1352.

The energy exchange assembly 1336 may be disposed within the regeneration air flow path 1318 downstream from the air filter 1352. The energy exchange assembly 1336 may be positioned within both the supply air flow path 1310 and the regeneration air flow path 1318. As such, the energy exchange assembly 1336 is configured to transfer sensible energy and latent energy between the regeneration air 1320 and the supply air 1312.

A heater 1354 may be disposed within the regeneration air flow path 1318 downstream from the energy exchange assembly 1336. The heater 1354 may be a natural gas, propane, or electric heater that is configured to heat the regeneration air 1320 before it encounters the energy transfer device 1334. Optionally, the energy exchange system 1300 may not include the heater 1354.

The energy transfer device 1334 is positioned within the regeneration air flow path 1318 downstream from the heater 1354. As noted, the energy transfer device 1334 may span between the regeneration air flow path 1318 and the supply air flow path 1310.

As shown in FIG. 18, the supply side 1335 of the energy transfer device 1334 is disposed within the supply air flow path 1310 proximate to the supply air inlet 1308, while the regeneration side 1337 of the energy transfer device 1334 is disposed within the regeneration air flow path 1310 proximate to the exhaust air outlet 1322. Accordingly, the supply air 3112 encounters the supply side 1335 as the supply air 1312 enters the supply air flow path 1310 from the outside, while the regeneration air 1320 encounters the regeneration side 1337 just before the regeneration air 1320 is exhausted out of the regeneration air flow path 1318 through the exhaust air outlet 1322.

One or more fans 1356 may be positioned within the regeneration air flow path 1318 downstream from the energy transfer device 1334. The fan(s) 1356 is configured to move the regeneration air 1320 from the regeneration air inlet 1316 and out through the exhaust air outlet 1322 (and ultimately into the atmosphere). Alternatively, the fan(s) 1356 may be located at various other areas of the regeneration air flow path 1318, such as proximate to the regeneration air inlet 1316. Also, alternatively, the energy exchange system 1300 may not include the fan(s).

The energy exchange system 1300 may also include a bypass duct 1358 having an inlet end 1360 upstream from the energy transfer device 1334 within the regeneration air flow path 1318. The inlet end 1360 connects to an outlet end 1362 that is downstream from the energy transfer device 1334 within the regeneration air flow path 1318. An inlet damper 1364 may be positioned at the inlet end 1360, while an outlet damper 1366 may be positioned at the outlet end 1362. The dampers 1364 and 1366 may be actuated between open and closed positions to provide a bypass line for the regeneration air 1320 to flow around the energy transfer device 1334. Further, a damper 1368 may be disposed within the regeneration air flow path 1318 downstream from the heater 1354 and upstream from the energy transfer device 334. The damper 1368 may be closed in order to allow the regeneration air to bypass into the bypass duct 1358 around the energy transfer device 1334. The dampers 1364, 1366, and 1368 may be modulated between fully-open and fully-closed positions to allow a portion of the regeneration air 1320 to pass through the energy transfer device 1334 and a remaining portion of the regeneration air 1320 to bypass the energy transfer device 1334. Alternatively, the energy exchange system 1300 may not include the bypass duct 1358 and dampers 1364 and 1366.

As shown in FIG. 18, the regeneration air 1320 enters the regeneration air flow path 1318 through the regeneration air inlet 1316. The regeneration air 1320 is then channeled through the energy exchange assembly 1336. After passing through the energy exchange assembly 1336, the regeneration air 1320 passes through the heater 1354, where it is heated, before encountering the energy transfer device 1334. The fan(s) 1356 may then move the regeneration air 1320 through the energy transfer device 1334 and into the atmosphere through the exhaust air outlet 1322.

As described above, the energy exchange assembly 1336 may be used with respect to the energy exchange system 300. Optionally, the energy exchange assembly 1336 may be used with various other systems that are configured to condition outside air and supply the conditioned air as supply air to an enclosed structure, for example. The energy exchange assembly 1336 may be positioned within a supply air flow path, such as the path 1310, and a regeneration or exhaust air flow path, such as the path 1318, of a housing, such as the housing 1304. The energy exchange system 1300 may include only the energy exchange assembly 1336 within the paths 1310 and 1318 of the housing 1304, or may alternatively include any of the additional components shown and described with respect to FIG. 18.

As described above, embodiments of the present disclosure provide systems and methods for forming a counter flow air-to-air energy exchange assembly with modular spacer components. Accordingly, embodiments of the present disclosure provide counter flow air-to-air energy exchange assemblies that may be efficiently and cost-effectively manufactured.

Embodiments of the present disclosure provide modular spacer assemblies that may be used with counter flow energy exchange systems, such as energy recovery cores. Embodiments of the present disclosure eliminate the need for large spacer molds. Further, embodiments of the present disclosure reduce the overall cost of an energy exchange assembly, in contrast to previous assemblies. Embodiments of the present disclosure provide modular spacer components that may be connected to one another to form spacer layers of varying sizes and shapes, and therefore energy exchange assemblies of varying sizes and shapes. Embodiments of the present disclosure also provide spacer components that are used to form an energy exchange assembly having air inlets and outlets that are proportional to the overall size of the assembly.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A counter flow air-to-air energy exchange assembly including a plurality of air channel levels configured to allow air to pass therethrough, wherein each of the plurality of air channel levels comprises:
   a spacer layer including: (a) a plurality of modular spacer components secured together, and (b) a plurality of air channels, wherein each of the plurality of air channels extends from an air inlet to an air outlet,
   wherein an outer boundary of the spacer layer is shaped as a hexagon, and
   wherein the plurality of modular spacer components comprises a first spacer component and a second spacer component that is identical in size and shape to the first spacer component, and each of the first and second spacer components has an outer boundary shaped as a trapezoid, the outer boundary of each spacer component formed by a plurality of walls.

2. The counter flow air-to-air energy exchange assembly of claim 1, wherein each of the plurality of air channels forms a Z-shape.

3. The counter flow air-to-air energy exchange assembly of claim 1, wherein each of the plurality of air channels forms a U-shape.

4. The counter flow air-to-air energy exchange assembly of claim 1, wherein the first spacer component directly secures to the second spacer component.

5. The counter flow air-to-air energy exchange assembly of claim 1, wherein the plurality of modular spacer components further comprises a third spacer component that differs from the first and second spacer components, wherein the third spacer component is positioned between the first and second spacer components.

6. The counter flow air-to-air energy exchange assembly of claim 5, wherein an outer boundary of the third spacer is shaped as a hexagon.

7. The counter flow air-to-air energy exchange assembly of claim 5, wherein the plurality of modular spacer components further comprises a fourth spacer component that is identical to the third spacer component, wherein the fourth spacer component connects to the third spacer component, and wherein the third and fourth spacer components are positioned between the first and second spacer components.

8. The counter flow air-to-air energy exchange assembly of claim 1, wherein the plurality of modular spacer components further comprises third and fourth spacer components that are identical to the first and second spacer components.

9. The counter flow air-to-air energy exchange assembly of claim 8, wherein the plurality of modular spacer components further comprises a fifth spacer component that differs from the first, second, third, and fourth spacer components,
   wherein the fifth spacer component provides an expansion piece.

10. A method of forming a counter flow air-to-air energy exchange assembly including a plurality of air channel levels configured to allow air to pass therethrough, the method comprising:
   securing a plurality of modular spacer components together, wherein the plurality of modular spacer components comprises a first spacer component and a second spacer component that is identical in size and shape to the first spacer component, and each of the first and second spacer components has an outer boundary shaped as a trapezoid, the outer boundary of each spacer component formed by a plurality of walls;

forming a spacer layer through the securing operation, the spacer layer having an outer boundary shaped as a hexagon;

positioning at least one membrane on the spacer layer to form an air channel level; and stacking the air channel level over another air channel level, wherein each of the plurality of air channels extends from an air inlet to an air outlet.

11. The method of claim 10, wherein each of the plurality of air channels forms a Z-shape.

12. The method of claim 10, wherein each of the plurality of air channels forms a U-shape.

13. The method of claim 10, wherein the forming operation comprises directly securing the first spacer component to the second spacer component.

14. The method of claim 10, wherein the forming operation comprises positioning a third spacer component between the first and second spacer components, wherein the third spacer component differs from the first and second spacer components.

15. The method of claim 14, wherein an outer boundary of the third spacer is shaped as a hexagon.

16. The method of claim 14, wherein the forming operation comprises:

positioning the third spacer components and a fourth spacer component between the first and second spacer components, wherein the third spacer is identical to the fourth spacer; and connecting the third and fourth spacer components together.

17. The method of claim 10, wherein the plurality of modular spacer components further comprises third and fourth spacer components that are identical to the first and second spacer components.

18. The method of claim 17, wherein the plurality of modular spacer components further comprises a fifth spacer component that differs from the first, second, third, and fourth spacer components, wherein the fifth spacer component provides an expansion piece.

19. A spacer layer assembly configured to form part of an air channel level of a counter flow air-to-air energy exchange assembly, the spacer layer assembly comprising:

a plurality of modular spacer components secured together to form a single spacer layer having an outer boundary shaped as a hexagon, wherein the plurality of modular spacer components comprises a first spacer component and a second spacer component that is identical in size and shape to the first spacer component, and each of the first and second spacer components has an outer boundary shaped as a trapezoid, the outer boundary of each spacer component formed by a plurality of walls.

* * * * *